CHLORINE APPARATUS
H. Deacon's Patent
118209    FIG. 1.
PATENTED AUG 22 1871
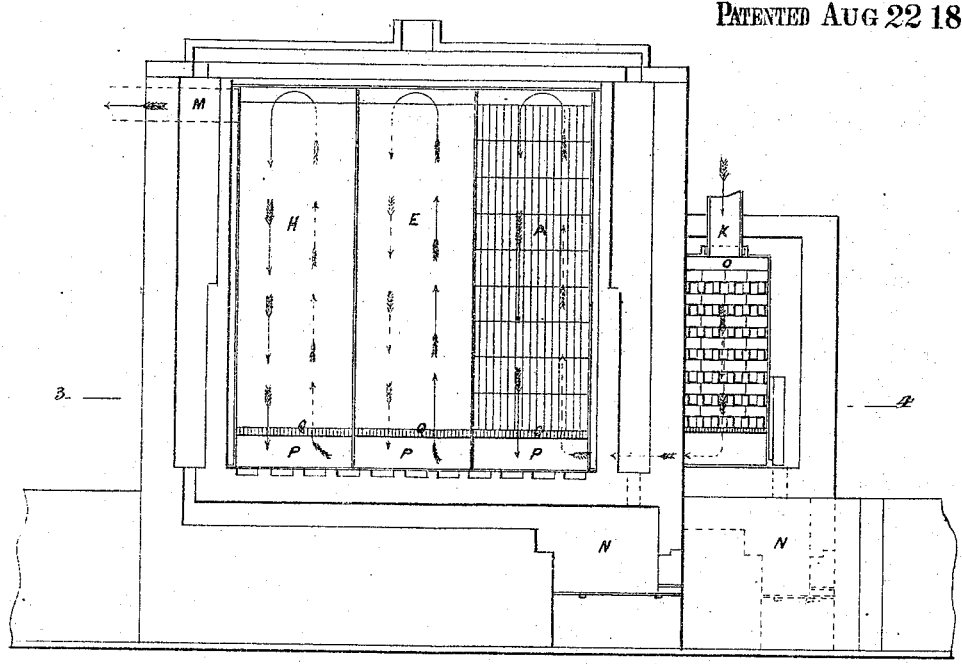
FIG. 2.
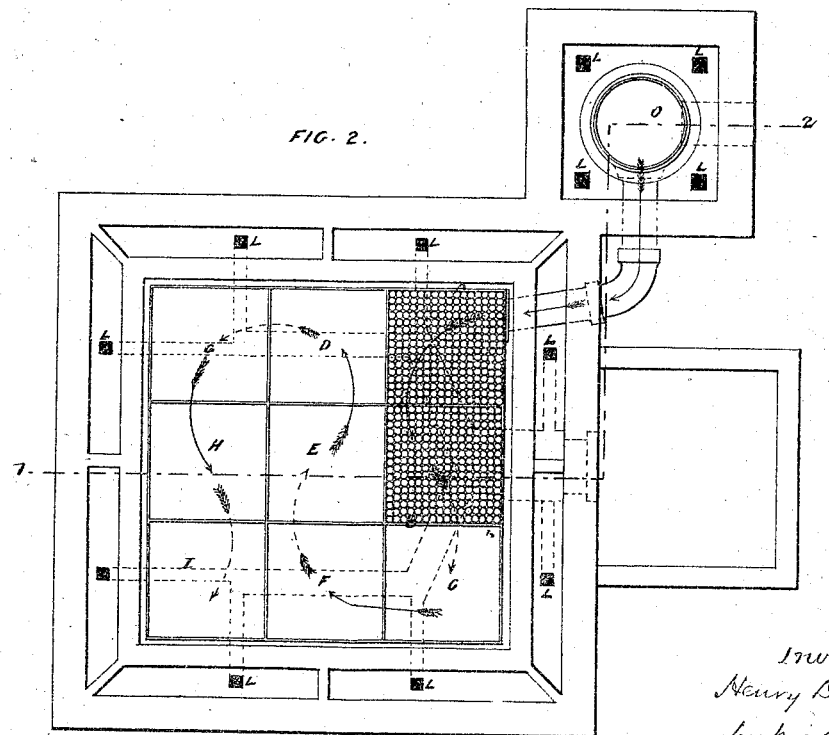
Witnesses.
Inventor.
Henry Deacon
by his attorney

UNITED STATES PATENT OFFICE.

HENRY DEACON, OF WIDNES, ENGLAND.

IMPROVEMENT IN APPARATUS FOR THE MANUFACTURE OF CHLORINE.

Specification forming part of Letters Patent No. 118,209, dated August 22, 1871.

*To all whom it may concern:*

Be it known that I, HENRY DEACON, of Appleton House, Widnes, in the county of Lancaster, England, alkali manufacturer, have invented Improvements in Apparatus for the Manufacture of Chlorine, of which the following is a specification:

My said invention relates to a peculiar construction and arrangement of apparatus to be employed in the manufacture of chlorine; and consists, essentially, in the employment of a column or tower, or a number of columns or towers connected together in a series, and made of iron or brick-work, or of both, or of any other suitable material filled with some active reagent, or with tiles, bricks, or pieces of burned clay, or other suitable material soaked with a solution of such reagent, and through these columns or towers I cause to pass a heated mixture of hydrochloric-acid gas and atmospheric air or oxygen, whereby chlorine is produced from the hydrochloric-acid gas. The column or towers may be surrounded by suitable coverings, or air-spaces, or flues, for the purpose of preventing the loss of heat, or of imparting or regulating the heat, as the circumstances of the manufacture require.

The active reagent may be sulphate of copper, as described in Letters Patent granted to me for the United States dated 29th of December, 1868; but this apparatus is not limited in its use to sulphate of copper. Where the heated gases enter among the materials filling these towers and chlorine begins to be liberated, more or less deposit of iron oxide, or chloride of iron, or dust, usually takes place, which, by accumulation, will fill up the interstices and prevent the passage of the gases. I therefore pass the gases first through bricks arranged with vertical spaces, or through vertical pipes supported on a grating or perforated plate over a vacant space, the bricks or pipes having been first saturated with sulphate of copper or other active reagent. The dust-like substance formed or deposited from the gases will fall through the vertical openings and descend into and remain in the vacant space below them, and from time to time can be withdrawn therefrom, and the free passage of the gases is thus preserved. When the gases are overheated some of the active reagent is liable to be sublimed, and when the gases are too cool the action is retarded. To avoid these irregularities as much as possible I fill a small separate column or tower with brick or other suitable material not impregnated with any reagent. This filling, by absorbing or giving out heat, according as it is cooler or hotter than the passing current of gases, keeps the gases issuing from it more nearly at an average temperature.

And in order that the said invention may be fully understood, I shall now proceed more particularly to describe the same, and for that purpose shall refer to the figures on the annexed drawing, the same letters of reference indicating corresponding parts in both figures.

Figure 1 of my drawing represents a sectional elevation of one form of my apparatus taken along the line 1 2 in Fig. 2, and Fig. 2 is a corresponding sectional plan taken along the line 3 4 in Fig. 1.

A, B, C, D, E, F, G, H, and I, is a series of towers constructed of iron or other material, through which the heated gases pass. The first or lowest portion of the first tower, or the whole of the first or more towers, are filled with the impregnated materials arranged with vertical spaces, and I find the ordinary agricultural drain-pipes of small bore convenient for this purpose. The other towers are filled with the impregnated materials in small pieces, spherical, flat, or mere shreds of burned clay, the object being to obtain the largest possible surface, over which the gases pass in the smallest bulk consistent with sufficient passage room for the gases to prevent the necessity of an inconveniently great draught or pressure to propel the gases. P P are the vacant chambers or spaces, into which the dust-like substance from the interstices in the towers above descend through the open grating or perforated plate Q, and are therein collected and removed as required. Preceding the towers may be used the apparatus O, which I call a "heat-regulator." It is constructed of the same material as the towers, and is filled with ordinary bricks set open or reticulated. Its office is to prevent sudden changes in the temperature of the gases reaching the towers. The contents of this heat-regulator either receive or impart heat as the gases increase or decrease in temperature, and to this extent regulate the temperature of the gases passing through it. I prefer this regulator to be apart from the rest of the apparatus, to avoid transmission of heat by conduction.

In the examples shown the gases enter by the pipe K and leave by M, following the course indicated by arrows, ascending one tower and descending the next, and so on. The towers and heat-regulator may be surrounded with brick-work, in which are left the flues L, communicating with fire-places N N. These fires and flues are not necessarily to be used as sources of heat, but surround the towers with a heated envelope, so that the loss of heat from the towers themselves may be regulated, as desired or prevented, altogether. The temperatures of the various parts are ascertained by pyrometers or in any convenient manner.

I claim—

1. The application and use of a vertical column or tower, or of a number of vertical columns or towers, connected together in a series filled with some active reagent, or with tiles, bricks, or pieces of burned clay or other suitable material soaked with a solution of such reagent, substantially as and for the purpose hereinbefore described.

2. The surrounding the herein-described column or tower, or columns or towers, with suitable coverings, or air-spaces, or flues, for the purpose of preventing loss of heat, or of imparting or regulating the heat, as the circumstances of the manufacture require.

3. The use of the hereinbefore-referred-to saturated bricks, or pieces of burned clay, or other suitable material, arranged with vertical spaces, or the use of vertical pipes saturated as described, supported over a vacant space or chamber below, so that the dust-like substance formed or deposited from the gases may fall through the vertical openings and descend into and remain in the vacant space below them until withdrawn therefrom.

4. The application and use of a heat-regulator, as and for the purpose hereinbefore described.

In testimony whereof I have signed my name to this specification in the presence of two subscribing witnesses.

HENRY DEACON.

Witnesses:
ALEXANDER WALKER,
JOHN HOWARD.